United States Patent [19]
Mizutani

[11] Patent Number: 6,115,740
[45] Date of Patent: Sep. 5, 2000

[54] VIDEO SERVER SYSTEM, METHOD OF DYNAMICALLY ALLOCATING CONTENTS, AND APPARATUS FOR DELIVERING DATA

[75] Inventor: Masami Mizutani, Kawasaki, Japan

[73] Assignee: Fujitsu Limited, Kawasaki, Japan

[21] Appl. No.: 09/017,326

[22] Filed: Feb. 2, 1998

[30] Foreign Application Priority Data

Sep. 18, 1997 [JP] Japan ................................. 9-253030

[51] Int. Cl.[7] .................................................. H04N 7/10
[52] U.S. Cl. ............................ 709/217; 348/7; 709/219
[58] Field of Search ........................... 348/7, 6, 10, 12, 348/13; 305/200.47; 709/217, 219

[56] References Cited

U.S. PATENT DOCUMENTS

| | | | |
|---|---|---|---|
| 5,453,779 | 9/1995 | Dan .............................................. | 348/7 |
| 5,530,557 | 6/1996 | Asit ........................................ | 395/200 |
| 5,544,313 | 8/1996 | Shachnai et al. ................... | 395/200.01 |
| 5,561,456 | 10/1996 | Yu ................................................ | 348/7 |
| 5,568,180 | 10/1996 | Okamoto ..................................... | 348/7 |
| 5,592,612 | 1/1997 | Birk ..................................... | 395/182.04 |
| 5,606,359 | 2/1997 | Youden et al. ............................. | 348/7 |
| 5,652,614 | 7/1997 | Okabayashi .................................. | 348/7 |
| 5,689,299 | 11/1997 | Isono et al. ................................. | 348/7 |
| 5,701,582 | 12/1997 | DeBey ..................................... | 455/5.1 |
| 5,751,336 | 5/1998 | Aggrawal et al. .......................... | 348/7 |
| 5,809,239 | 9/1998 | Dan ........................................... | 348/7 |
| 5,870,551 | 2/1999 | Ozden et al. ....................... | 395/200.49 |
| 5,935,206 | 8/1999 | Dixon et al. ............................ | 709/217 |

*Primary Examiner*—Andrew I. Faile
*Assistant Examiner*—Reuben M. Brown
*Attorney, Agent, or Firm*—Staas & Halsey LLP

[57] ABSTRACT

A video server system dynamically allocates contents for efficient services. The video server system has a plurality of video servers having respective contents storing units for storing contents and respective contents delivering units for delivering contents. A management server has a stream supply information managing unit for managing stream supply information relative to the delivery of the contents and a contents dynamic allocating unit for controlling the storage of the contents between the video servers to dynamically allocate contents based on stream supply information from the stream supply information managing unit.

8 Claims, 17 Drawing Sheets

FIG. 4

211 VIDEO SERVER OPERATING STATUS INFORMATION TABLE

| VIDEO SERVER ID (211a) | A(s, t) (211b) | STORED CONTENT (211c) | Rs (211d) | REMAINING STORABLE CONTENTS NUMBER (211e) |
|---|---|---|---|---|
| 1 | A(1, t) | C0, C1 | R1 | |
| ---- | ---- | ---- | ---- | ---- |
| k | A(k, t) | | Rk | |

FIG. 5

212 CONTENTS ALLOCATION MANAGING INFORMATION TABLE

| CONTENTS ID (212a) | $P_i(t)$ (212b) | $B(i, t)$ (212c) | $T_i$ (212d) | STORING VIDEO SERVER LIST (212e) |
|---|---|---|---|---|
| 1 | $P_1(t)$ | $B(1, t)$ | $T_1$ | |
| ---- | ---- | ---- | ---- | ---- |
| m | $P_m(t)$ | $B(m, t)$ | $T_m$ | |

213 TERTIARY MEMORY OPERATING STATUS INFORMATION TABLE

| 213a TERTIARY MEMORY USAGE | 213b VIDEO SERVER ID | 213c CONTENTS ID |
|---|---|---|
| | | |

FIG. 6

VIDEO SERVER SYSTEM, METHOD OF DYNAMICALLY ALLOCATING CONTENTS, AND APPARATUS FOR DELIVERING DATA

BACKGROUND OF THE INVENTION (1) Field of the Invention

The present invention relates to a video server system, a method of dynamically allocating contents, and an apparatus for delivering data, and more particularly to a video server system for controlling the delivery of data requested by clients, a method of dynamically allocating contents, and a data delivery apparatus for controlling the delivery of data.

(2) Description of the Related Art

Video servers deliver contents such as of digital moving image data to terminals connected through LANs and communication networks, and serve as one of the major elements of multimedia services.

In recent years, the overall system of video servers tends to become huge and complex as multimedia services exemplified by VOD (video-on-demand) systems are finding widespread use.

There are demands for technologies for reducing the burden on operators who run large-scale systems such as community antenna television systems.

Generally, there is a certain upper limit on the maximum number of streams of a content that can be delivered at one time from a video server in order to ensure a desired video image quality for the delivered streams. The maximum number of streams of a content that can be delivered at one time from an entire video server system may be increased by increasing the number of installed video servers.

Individual servers that are clustered are referred to as video servers, and an overall system of such video servers as a video server system.

FIG. 14 of the accompanying drawings schematically shows a conventional video server system 100. The video server system 100 includes a video server 102a storing contents C0, C1 and a video server 102b storing a content C2.

The video server system 100 also has a management server 101 for controlling operation of the video servers 102a, 102b and an ATM-SW 103 for switching streams of contents delivered from the video servers 102a, 102b and distributing the streams of contents to clients 300a~300n requesting the streams of contents.

Each of the video servers 102a, 102b can deliver a maximum number Nstrm of streams of contents. Specifically, the video server 102a can deliver a maximum number Nstrm of streams of the contents C0, C1, and the video server 102b can deliver a maximum number Nstrm of streams of the content C2.

It is assumed that the video server 102a is delivering streams whose number is the maximum number Nstrm. Since the video server system 100 has an overall stream supply capability of 2×Nstrm, 50% of the stream supply capability of the video server system 100 is now used.

If the streams which are being delivered by the video server 102a are all of the content C0, then when there is a request for the delivery of streams of the content C1, the video server system 100 is unable to deliver streams of the content C1 though the video server system 100 still has available remaining 50% of the stream supply capability. Accordingly, the video server system 100 rejects the request for the delivery of streams of the content C1.

In order to avoid such rejection of a request for the delivery of content streams, it is necessary that the content C1 also be stored in the video server 102b beforehand in expectation of a concentration of access to the content C1.

If there is a possibility that the video server 102b may suffer the same problem, then the video server system 100 needs to have an additional video server and allocate appropriate contents in the additional video server.

If the estimated number of video servers which are required to be installed is represented by Nvsa, then the estimated number Nvsa is determined according to the following equation (1):

$$Nvsa = \left[ \sum_i Pi / Nstrm \right] \quad (1)$$

where Pi represents the maximum number of times that each of the contents is simultaneously accessed per day, i represents the type of a content, and [ ] represents raising to unit.

FIG. 15 of the accompanying drawings is a diagram showing the maximum numbers of times that respective contents are simultaneously accessed in one day. The diagram has a vertical axis representing the maximum number Pi of times that each of the contents is simultaneously accessed in one day and a horizontal axis representing contents Ci. It is assumed that the maximum number Nstrm of content streams that can be delivered from a video server is 20.

It is predicted that the maximum number P0 of times that a content C0 is simultaneously accessed is 47, the maximum number P1 of times that a content C1 is simultaneously accessed is 33, the maximum number P2 of times that a content C2 is simultaneously accessed is 22, the maximum number P3 of times that a content C3 is simultaneously accessed is 4, the maximum number P4 of times that a content C4 is simultaneously accessed is 5, and the maximum number P5 of times that a content C5 is simultaneously accessed is 7. According to this prediction, the estimated number of video servers which are required to be installed is calculated as (47+33+22+6+5+7)/20=6 by the above equation (1). Therefore, the number of video servers which are required to be installed is 6.

FIG. 16 of the accompanying drawings show six video servers with the contents shown in FIG. 15 being actually allocated thereto. In FIG. 16, each of video servers 110~115 has a maximum number Nstrm of 20, and numerals in parentheses represent the maximum numbers of streams of the contents that can be delivered from the respective video servers.

Specifically, the content C0 is allocated to the video server 110 and the maximum number of streams of the content C0 that can be delivered from the video server 110 is 20. The content C1 is allocated to the video server 111 and the maximum number of streams of the content C1 that can be delivered from the video server 110 is 20. The contents C0, C1 are allocated to the video server 112 and the maximum numbers of streams of the contents C0, C1 that can be delivered from the video server 112 are 7, 13, respectively. The content C1 is allocated to the video server 113 and the maximum number of streams of the content C1 that can be delivered from the video server 113 is 20. The content C2 is allocated to the video server 114 and the maximum number of streams of the content C2 that can be delivered from the video server 114 is 20. The contents C2, C3, C4, C5 are allocated to the video server 115 and the maximum numbers of streams of the contents C2, C3, C4, C5 that can be delivered from the video server 115 are 2, 6, 5, 7, respectively.

Therefore, it has heretofore been customary to predict concentrated access to certain contents, estimate the number of video servers to be installed, and statistically allocate appropriate contents in the video servers before the video server system is put into service.

With the above conventional static contents allocation, however, the number of video servers needed is estimated on the assumption that the maximum numbers P0~P5 of times that the respective contents C0~C5 are simultaneously accessed in one day are based on being accessed at the same time.

FIG. 17 of the accompanying drawings is a diagram showing distributions of the numbers of times that the contents are accessed. The diagram has a vertical axis representing the number of times that a content is simultaneously accessed and a horizontal axis representing time (one day). Only contents C0~C2 are illustrated for the sake of brevity.

In FIG. 17, the maximum numbers P0~P2 of times that the respective contents C0~C2 are simultaneously accessed occur at a common time t0. Pa represents the maximum number of times that all the contents C0~C2 are simultaneously accessed in one day. Therefore, the maximum number Pa indicates the sum of the maximum numbers P0~P2 of times that the respective contents C0~C2 are simultaneously accessed at the time t0.

According to the conventional static contents allocation scheme, the number of video servers to be installed is estimated on the basis of the maximum number Pa.

Actually, the distributions shown in FIG. 17 rarely occur in normal circumstances because of different kinds of contents and different preferences of users. For example, news programs are popular in the morning, and movies are popular in the evening, and some users prefer to see video programs early in the evening and others late in the evening.

Consequently, the estimated number of video servers to be installed is usually excessive and investments in the facility of the video server system are too costly according to the conventional static contents allocation scheme.

Another problem is that the operator of the video server system is subject to a large burden because the operator is required to allocate contents appropriately before the video server system is put into operation and during maintenance of the video server system.

SUMMARY OF THE INVENTION

It is therefore an object of the present invention to provide a video server system which has contents dynamically allocated for efficient services.

Another object of the present invention is to provide a method of dynamically allocating contents for efficient services.

Still another object of the present invention is to provide an apparatus for delivering data by dynamically allocating the data.

According to an aspect of the present invention, there is provided a video server system for controlling the delivery of contents requested by clients. The video server system comprises a plurality of video servers having respective contents storing means for storing contents and respective contents delivering means for delivering contents, and a management server having stream supply information managing means for managing stream supply information relative to the delivery of the contents and contents dynamic allocating means for controlling the storage of the contents between the video servers to dynamically allocate contents based on stream supply information from the stream supply information managing means.

According to another aspect of the present invention, there is provided a method of dynamically allocating contents. The method comprises the steps of detecting whether at least the number of streams of a content stored in a video server or the predictable number of accesses exceeds a corresponding threshold value or not, and if the number exceeds the threshold value, controlling the storage of the content between the video server or another video server, for thereby dynamically allocating the content.

According to still another aspect of the present invention, there is provided a data delivery apparatus for controlling the delivery of data. The data delivery apparatus comprises data memory means for storing data, data storing means for storing data to be requested, data delivering means for delivering the data stored in the data storing means, data supply information managing means for managing data supply information relative to the delivery of the data, and data storage controlling means for controlling the storage of data between the data memory means and the data storing means or between the data storing means based on the data supply information.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram showing a video server operating status information table;

FIG. 5 is a diagram showing a contents allocation managing information table;

FIG. 6 is a diagram showing a tertiary memory operating status information table;

DETAILED DESCRIPTION OF THE PREFERRED EMBODIMENTS

Figure 1:
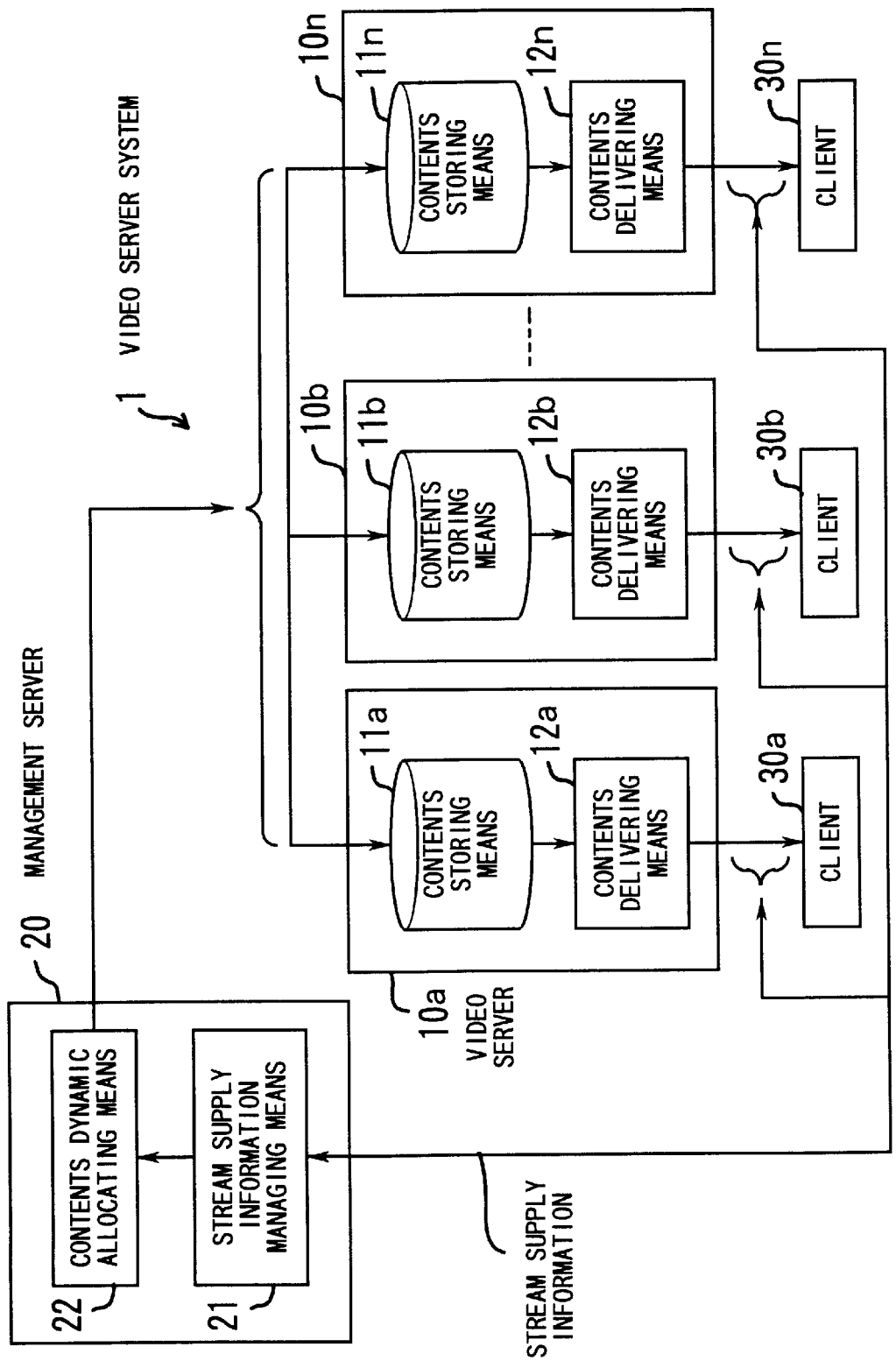
FIG. 1 is a block diagram of a video server system according to the present invention.

As shown in FIG. 1, a video server system 1 according to the present invention controls the delivery of contents requested by a plurality of clients 30a~30n.

The video server system 1 comprises a plurality of video servers 10a~10n which have respective contents storing means 11a~11n for storing contents and respective contents delivering means 12a~12n for delivering contents.

The video server system 1 also includes a management server 20 having a stream supply information managing means 21 for managing stream supply information relative to the delivery of contents and a contents dynamic allocating means 22 for controlling the storage of contents between the video servers 10a~10n to dynamically allocate the contents based on stream supply information from the stream supply information managing means 21.

Contents delivered from the video servers 10a~10n are switched by an ATM-SW (not shown) and distributed to the clients 30a~30n.

Figure 2:
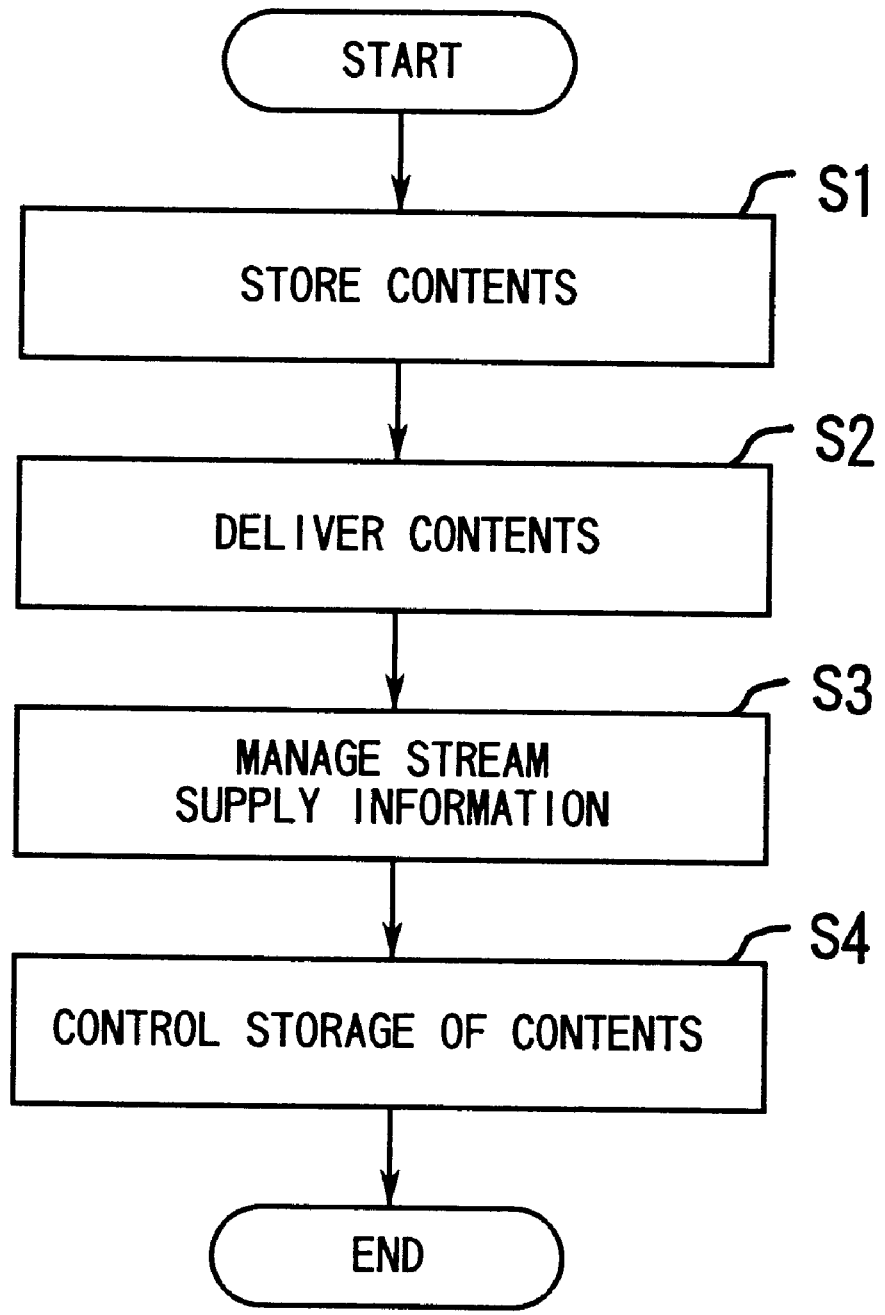
FIG. 2 is a flowchart of an operation sequence of the video server system according to the present invention.

Operation of the video server system 1 will be described below with reference to FIG. 2. FIG. 2 shows operation sequence of the video server system 1, with successive steps being represented by numerals prefixed by "S".

(S1) The contents storing means 11a~11 n store contents.

(S2) The contents delivering means 12a~12n deliver contents.

(S3) The stream supply information managing means 21 manages stream supply information regarding the delivery of contents.

(S4) When there are requests from the clients 30a~30n, the contents dynamic allocating means 22 controls the storage of contents between the video servers 10a~10n to dynamically allocate the contents based on stream supply information from the stream supply information managing means 21. The contents dynamic allocating means 22 controls the storage of contents by copying, moving, and deleting the contents.

Figure 3:
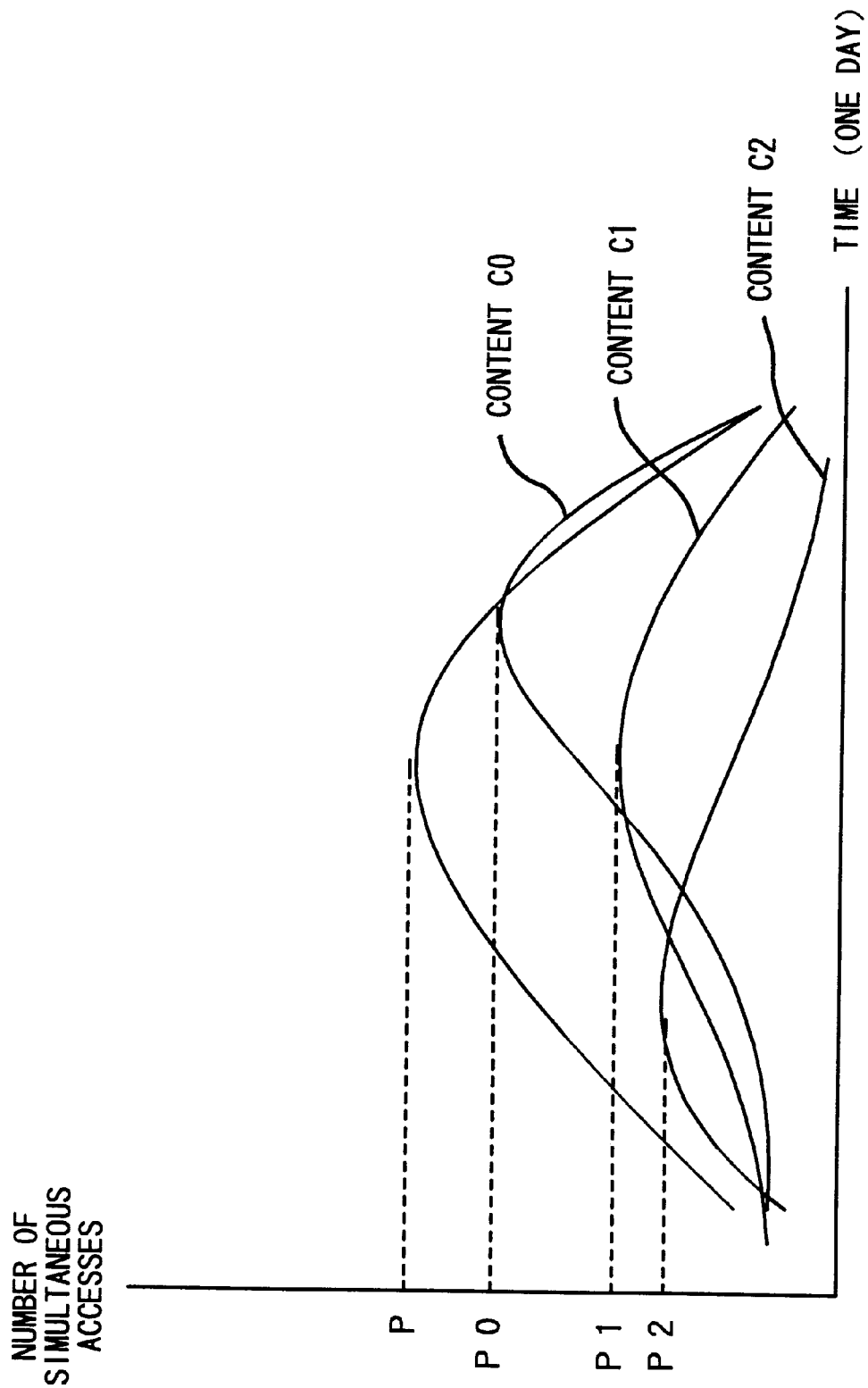
FIG. 3 is a diagram showing distributions of the numbers of times that contents are accessed.

The number of video servers 10a~10 n which are required to be installed in the video server system 1 will be described below. FIG. 3 is a diagram which shows distributions of the numbers of times that contents C0, C1, C2 are accessed. The diagram has a vertical axis representing the number of times that a content is simultaneously accessed, and a horizontal axis representing time (one day).

Generally, as shown in FIG. 3, the maximum numbers Pi of times that the respective contents C0~C2 are simultaneously accessed do not occur at a certain common time. Therefore, the maximum number P of times that all the contents C0~C2 are simultaneously accessed in one day is usually smaller than the sum of the maximum numbers P0~P2 of times that the respective contents C0~C2 are simultaneously accessed.

Based on the maximum number P of times that all the contents C0~C2 are simultaneously accessed in one day, the number Nvs of video servers that are required to be installed is estimated according to the following equation (2):

$$Nvs=[P/Nstrm] \qquad (2)$$

where Nstrm represents the maximum number of streams of contents that can be delivered from a video server, and [ ] represents raising to a unit.

The video server system 1 according to the present invention has as many video servers 10a~10n as the number calculated according to the above equation (2). The video server system 1 dynamically allocates contents in the video servers 10a~10n, the number of which has thus been determined, depending on the actual access to the contents, and performs its services with the video servers 10a~10n.

Predicted values used for the video server system 1 to dynamically allocate contents in the video servers 10a~10n will be described below.

One of the predicted values is a predicted maximum number A(s,t) of times that a video server s is simultaneously accessed at a time t. If it is assumed that there is a request from a client at the time t, the predicted number of times that a content i is simultaneously accessed at the time t is represented by Pi(t), and the number of video servers which store the content i is represented by Di, then the predicted maximum number A(s,t) is given by the following equation (3):

$$A(s, t) = \sum_i \frac{Pi(t)}{Di} E(s, i) \qquad (3)$$

where E(s,i) is "1" if the content i exists in the video server s and "0" if the content i does not exist in the video server s.

If there is a request from a user at the time t, then the video server whose A(s,t) is the smallest serves as a delivering video server for delivering a requested content.

Another predicted value is a number B(i,t) of lacking resources of the content i predicted at the time t. Resources signify a supplied quantity of streams of the content i, i.e., a supplied number of streams of the content i.

If it is assumed that there is a request from a client at the time t, the predicted number of times that the content i is simultaneously accessed at the time t is represented by Pi (t), the number of remaining streams that can be delivered from the video server s is represented by Rs, and the number of times that the content i is simultaneously accessed is represented by Ti, then the predicted maximum number B(i,t) is given by the following equation (4):

$$B(i, t) = Pi(t) - Ti + \sum_s Rs \cdot E(s, i) \quad (Pi(t) \geq Ti) \qquad (4)$$

The predicted maximum number B(i,t) according to the equation (4) is defined only when Pi(t)≧Ti. When Pi(t)<Ti, the prediction of the number B(i,t) of lacking resources of the content i is invalid.

When B(i,t)>0, there is a possibility that no sufficient resources will be available for the content i. When B(i,t)<0, sufficient resources will be available for the content i.

Therefore, the predicted maximum number B(i,t) is periodically checked for all the contents, and the contents are dynamically allocated by being copied, moved, and deleted so that B(i,t)=0 as much as possible.

The stream supply information managing means 21 in the management server 20 will be described below. The stream supply information managing means 21 manages stream supply information with respect to the delivery of contents from the video servers 10a~10n.

The stream supply information includes video server operating status information, contents allocation managing information, and tertiary memory operating status information.

A tertiary memory comprises a mass-storage memory such as a magnetooptical disk or the like disposed in the video server system 1 for storing a library of contents to be delivered to the clients.

FIG. 4 shows a video server operating status information table 211. The video server operating status information table 211 is managed in the stream supply information managing means 21.

The video server operating status information table 211 has a video server ID column 211a containing information indicative of the IDs of video servers, an A(s,t) column 211b containing information indicative of the predicted maximum numbers of times that video servers s are simultaneously accessed, a stored content column 211c containing information indicative of the types of contents stored in the video servers, an Rs column 211d containing information indicative of the numbers of remaining streams that can be delivered from the video servers, and a remaining storable contents number column 211e containing information indicative of the numbers (storage capacities) of contents which can be stored in the video servers.

FIG. 5 shows a contents allocation managing information table 212. The contents allocation managing information table 212 is managed in the stream supply information managing means 21.

The contents allocation managing information table 212 has a contents ID column 212a containing information indicative of the IDs of respective contents, a Pi(t) column 212b containing information indicative of the predicted maximum numbers of times that contents i are simultaneously accessed, a B(i,t) column 212c containing information indicative of the numbers of insufficient resources of the contents i, a Ti column 212d containing information indicative of the numbers of times that contents i are simultaneously accessed at present, and a storing video server list column 212e containing information indicative of the IDs of video servers in which contents are stored.

FIG. 6 shows a tertiary memory operating status information table 213. The tertiary memory operating status information table 213 is managed in the stream supply information managing means 21.

The tertiary memory operating status information table 213 has a tertiary memory usage column 213a containing information indicative of whether the tertiary memory is presently in use or not, a video server ID column 213b containing information indicative of the ID of a video server which is using the tertiary memory in connection therewith, and a contents ID column 213c containing information indicative of the ID of a content that is being stored in the tertiary memory.

The contents dynamic allocating means 22 in the management server 20 will be described below. The contents dynamic allocating means 22 controls the storage of contents between the video servers 10a–10n to dynamically allocate the contents based the information contained in the tables shown in FIGS. 4–6.

Figure 7:
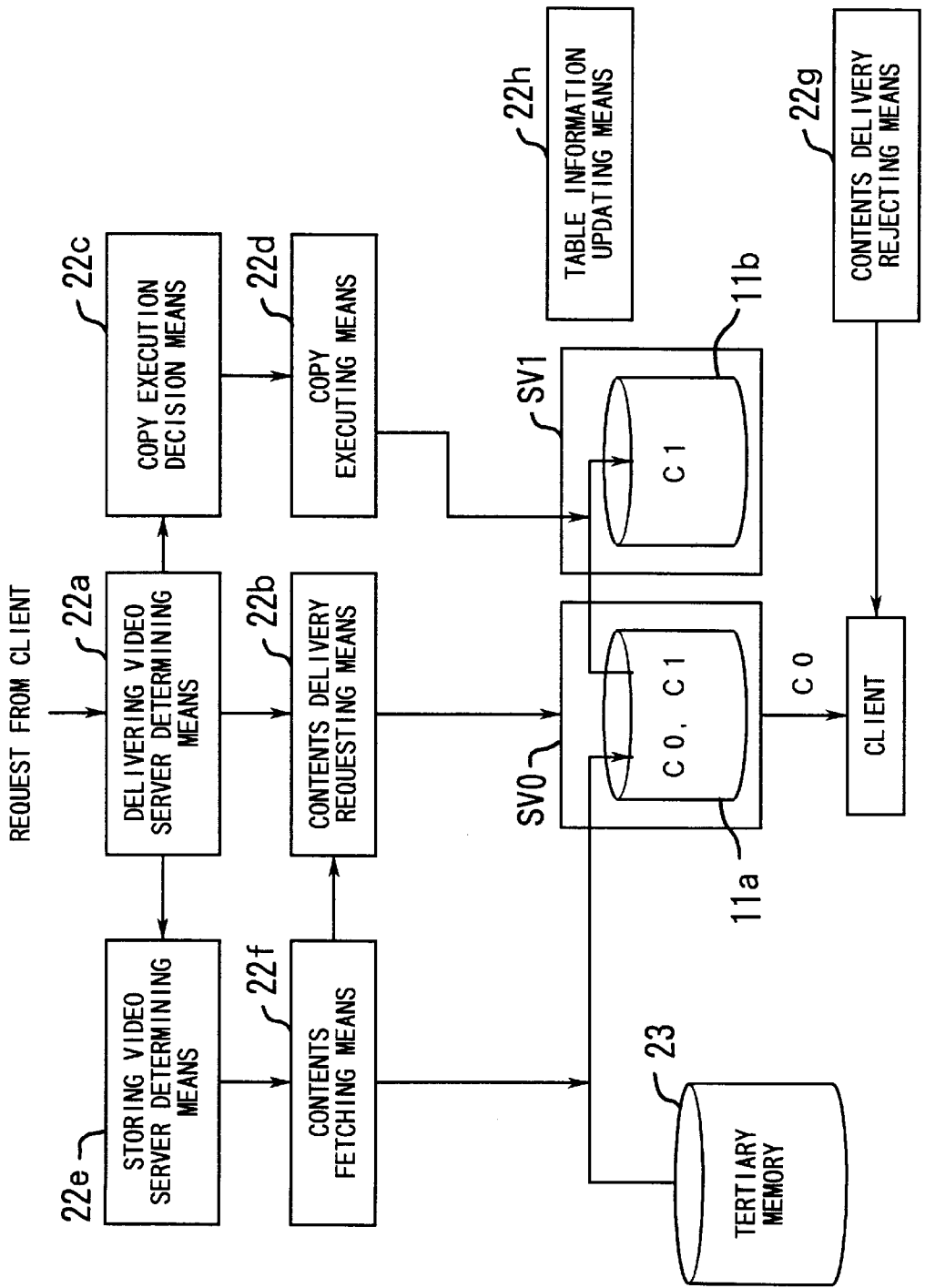
FIG. 7 is a block diagram of a contents dynamic allocating means.

FIG. 7 shows in block form the contents dynamic allocating means 22 in greater detail. In FIG. 7, a delivering video server determining means 22a determines a video server for delivering a content identified by a contents ID requested by a client.

Specifically, the delivering video server determining means 22a determines a video server whose A(s,t) is the smallest, among those video servers which are storing the content identified by the contents ID. It is assumed for illustrative purposes that a client has requested the delivery of a content C0 and a video server SV0 is selected as a video server for delivering the content C0.

A contents delivery requesting means 22b requests the video server SV0 to deliver the content C0.

A copy execution decision means 22c detects a content (which is assumed to be a content C1) that most suffers lack of resources when the content C0 is delivered from the video server SV0, and determines a video server (which is assumed to be a video server SV1) to which the content C1 is to be copied.

For detecting the content C1, the copy execution decision means 22c calculates the number of lacking resources of each of the contents stored in the video server SV0 according to the equation (4). If Pi(t)<Ti, and hence the prediction of the number of lacking resources is invalid, then the copy execution decision means 22c copies the content with respect to which the equation (4) is calculated.

If Pi(t)≧Ti, then the copy execution decision means 22c detects a content whose B(i,t) is positive and maximum. If such a content exists, then the copy execution decision means 22c copies that content. If such a content does not exist, then no contents copying is required.

A copy executing means 22d requests the video server SV0 to copy the content C1 from the video server SV0 to the video server SV1, and also requests the video server SV1 to store the content C1.

If the available storage capacity of the contents storing means 11b of the video server SV1 is not large enough to store the content C1, then the copy executing means 22d selects a content which least suffers the possibility of lack of resources in the contents storing means 11b, and deletes the selected content from the contents storing means 11b.

The copy executing means 22d selects a content whose B(i,t) is negative and the smallest as the content to be deleted from the contents storing means 11b.

If the delivering video server determining means 22a fails to determine a video server for delivering the content C0, i.e., if the content C0 does not exist in any of the video servers, then a storing video server determining means 22e determines a video server for storing the content C0 which will be fetched from a tertiary memory 23.

For determining a video server, the storing video server determining means 22e selects a video server whose A(s,t) is the smallest among those video servers which do not store the content C0.

A contents fetching means 22f fetches the content C0 from the tertiary memory 23 and stores the content C0 into the video server SV0.

If the available storage capacity of the contents storing means 11a of the video server SV0 is not large enough to store the content C0, then the contents fetching means 22f selects a content which least suffers the possibility of lack of resources in the contents storing means 11a, and deletes the selected content from the contents storing means 11a. The contents fetching means 22f selects a content whose B(i,t) is negative and the smallest as the content to be deleted from the contents storing means 11a.

If the requested content C0 cannot be delivered to the client, a contents delivery rejecting means 22g indicates a rejection of the delivery of the content C0 to the client. A table information updating means 22h updates the information of each of the tables.

Figure 8:
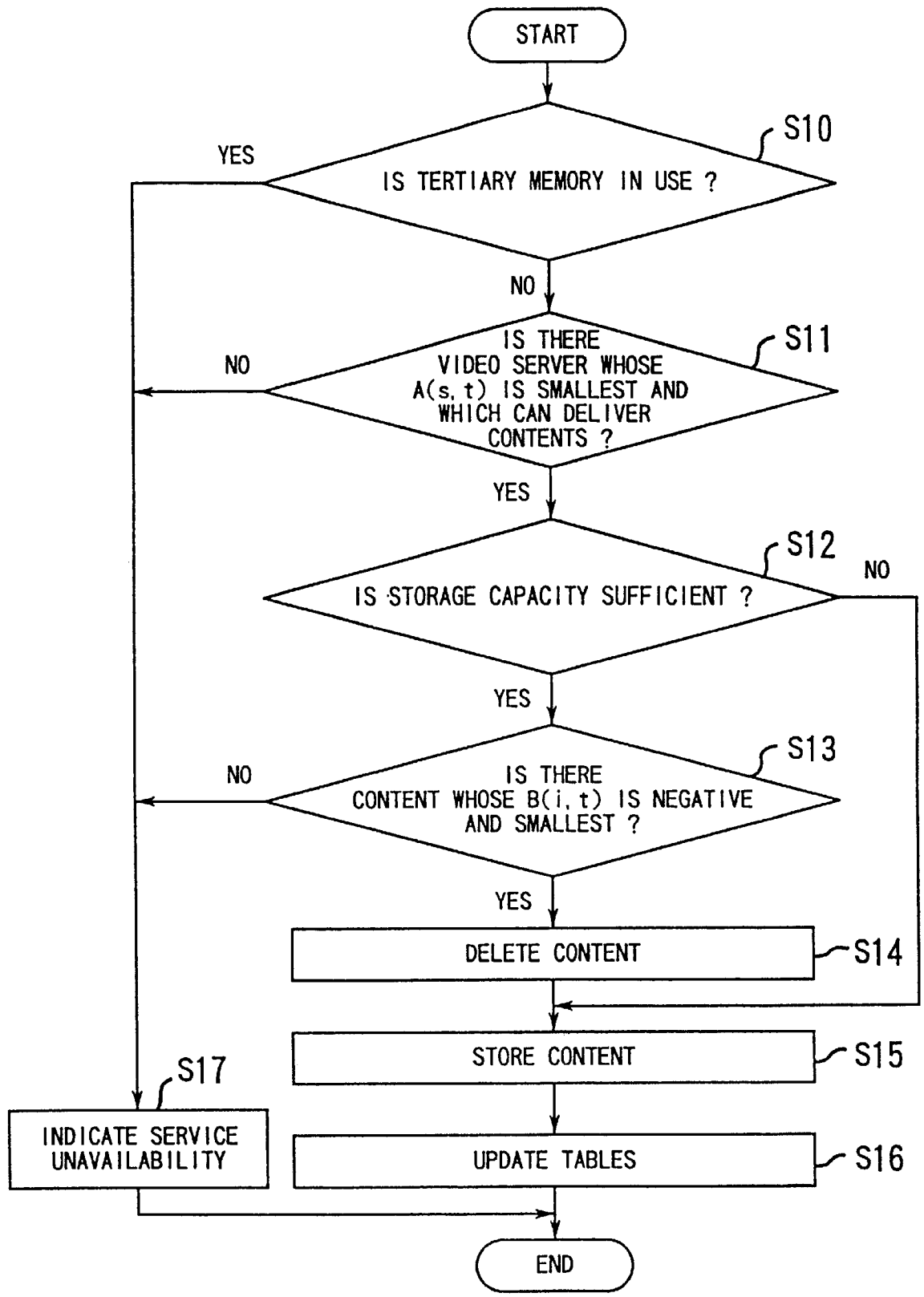
FIG. 8 is a flowchart of a processing sequence of a process of dynamically allocating contents.

A process of dynamically allocating contents will be described below with reference to FIG. 8. The process of dynamically allocating contents shown in FIG. 8 is carried out if the content C0 is not present in the video servers when the delivery of the content C0 is requested by a client. In FIG. 8, successive steps are represented by numerals prefixed by "S".

(S10) The storing video server determining means 22e checks the tertiary memory operating status information table 213 to ascertain if the tertiary memory 23 is now in use or not. If the tertiary memory 23 is in use, then control jumps to a step S17. If the tertiary memory 23 is not in use, then control proceeds to a step S11.

(S11) The storing video server determining means 22e checks the Rs column 211d and the A(s,t) column 211b in the video server operating status information table 211 to search for a video server whose A(s,t) is the smallest among those video servers which can deliver contents. If there is such a video server (which is assumed to be the video server SV0), then control proceeds to a step S12. If there is not such a video server, then control jumps to the step S17.

(S12) The storing video server determining means 22e checks the remaining storable contents number column 211e in the video server operating status information table 211 to ascertain if the storage capacity of the video server SV0 is sufficient or not. If the storage capacity of the video server SV0 is not sufficient, then control proceeds to a step S13. If the storage capacity of the video server SV0 is sufficient, then control jumps to a step S15.

(S13) The contents fetching means 22f checks the contents allocation managing information table 212 to search for a content which is not in service and whose B(i,t) is negative and the smallest, among those contents which are stored in the video server SV0. If there is such a content, then control proceeds to a step S14. If there is not such a content, then control jumps to the step S17.

(S14) The contents fetching means 22f deletes the content found in the step S13 from the video server SV0.

(S15) The contents fetching means 22f fetches the content C0 from the tertiary memory 23 and stores the content C0 into the video server SV0. The contents delivery requesting means 22b requests the video server SV0 to deliver the content C0. The delivery service is initiated while the content C0 is being stored into the video server SV0.

(S16) The table information updating means 22h updates the information of each of the tables.

(S17) The contents delivery rejecting means 22g indicates to the client that the service of delivering the requested content C0 is not available.

Figure 9:
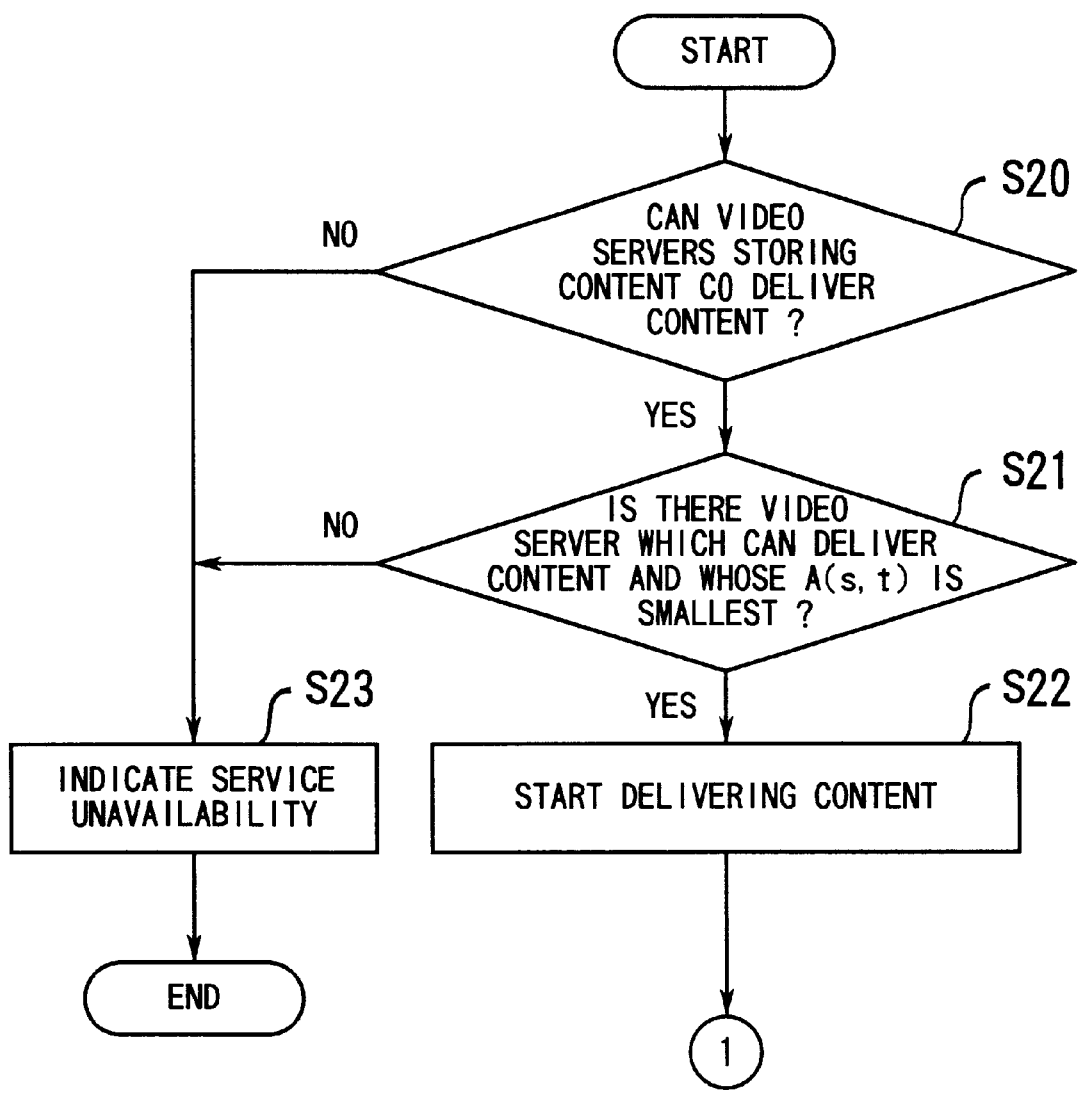
FIGS. 9 and 10 are a flowchart of a processing sequence of another process of dynamically allocating contents.
Figure 10:
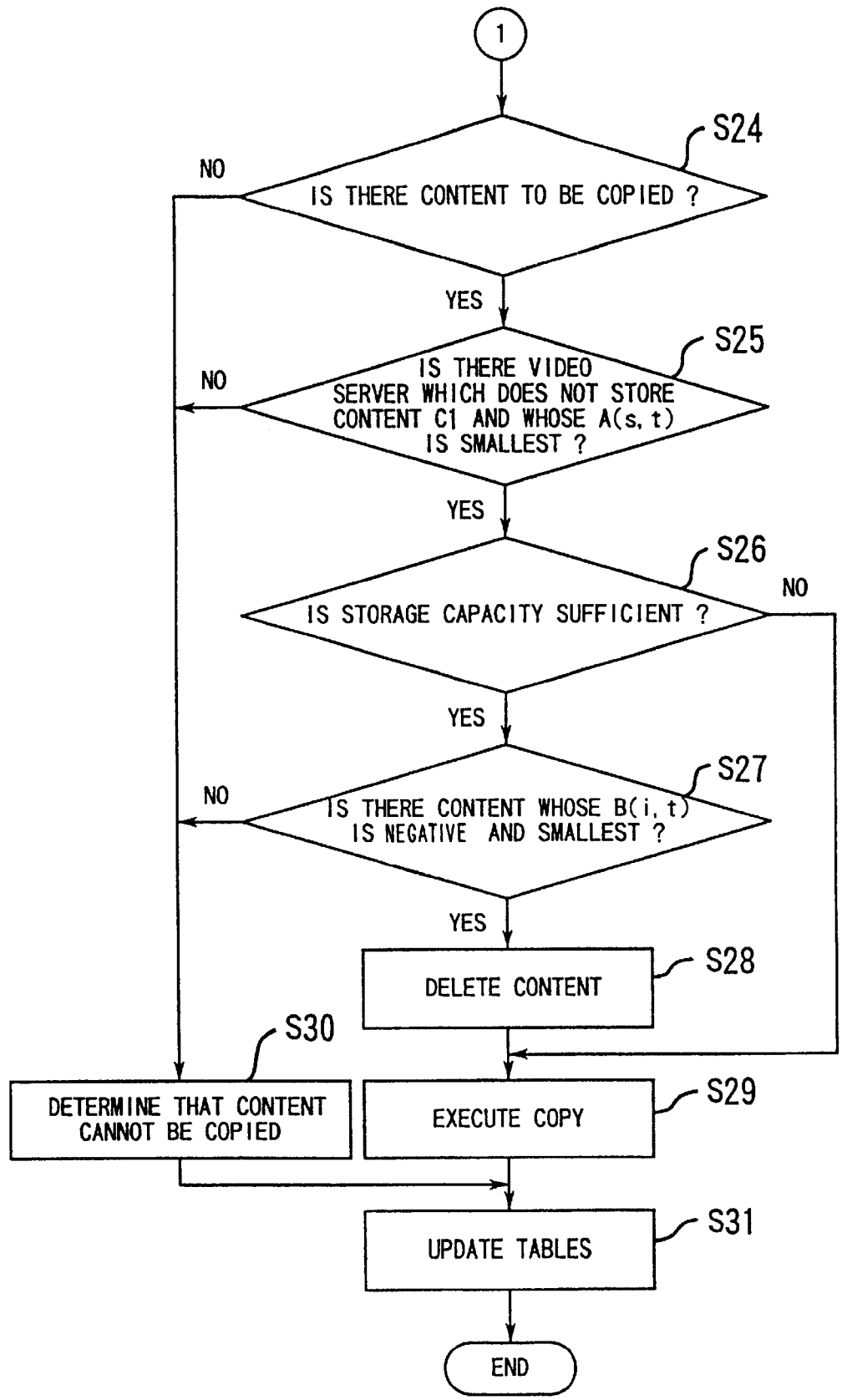

FIGS. 9 and 10 show a processing sequence of another process of dynamically allocating contents. The process of dynamically allocating contents shown in FIGS. 9 and 10 is carried out if the content C0 is present in a video server when the delivery of the content C0 is requested by a client. In FIGS. 9 and 10, successive steps are represented by numerals prefixed by "S".

(S20) The delivering video server determining means 22a checks the Rs column 211d in the video server operating status information table 211 to ascertain if all video servers storing the content C0 can deliver the content C0. If they can deliver the content C0, then control proceeds to a step S21. If they cannot, then control jumps to a step S23.

(S21) The delivering video server determining means 22a checks the video server operating status information table 211 to search for a video server which can deliver the content C0 and whose A(s,t) is the smallest. If there is such a video server (which is assumed to be the video server SV0), then control proceeds to a step S22. If there is not such a video server, then control jumps to the step S23.

(S22) The contents delivery requesting means 22b requests the video server SV0 to deliver the content C0. The service of delivering the content C0 is now started.

(S23) The contents delivery rejecting means 22g indicates to the client that the service of delivering the requested content C0 is not available.

(S24) The copy execution decision means 22c detects a content (which is assumed to be the content C1) that most suffers lack of resources when the content C0 is delivered from the video server SV0.

A content with respect to which $Pi(t)<Ti$ and the difference between $Pi(t)$ and $Ti$ is the greatest in the equation (4) is assumed to be the content C1 to be copied.

If $B(i,t)$ according to the equation (4) is positive, then a content with respect to which $B(i,t)$ is of the greatest value is assumed to be the content C1 to be copied. If the content C1 is present, then control proceeds to a step S25. If the content C1 is not present, then control jumps to a step S30.

(S25) The copy execution decision means 22c searches for a video server (which is assumed to be the video server SV1) whose A(s,t) is the smallest among those video servers which do not have the content C1 and can deliver and store contents. If the video server SV1 is present, then control proceeds to a step S26. If the video server SV1 is not present, then control jumps to the step S30.

(S26) The copy execution decision means 22c checks the from the remaining storable contents number column 211e in the video server operating status information table 211 to ascertain if the storage capacity of the video server SV1 is sufficient or not. If the storage capacity of the video server SV1 is not sufficient, then control proceeds to a step S27. If the storage capacity of the video server SV1 is sufficient, then control jumps to a step S29.

(S27) The copy executing means 22d checks the B(i,t) column 212c in the contents allocation managing information table 212 to search for a content (which is assumed to be the content C2) which is not in service and whose B(i,t) is negative and the smallest, among those contents which are stored in the video server SV1. If the content C2 is present, then control proceeds to a step S28. If the content C2 is not present, then control jumps to the step S30.

(S28) The copy executing means 22d deletes the content C2 from the video server SV1.

(S29) The copy executing means 22d requests the video server SV0 to copy the content C1 from the video server SV0 to the video server SV1, and also requests the video server SV1 to store the content C1, thereby executing a copying process.

(S30) The copy execution decision means 22c determines that a content cannot be copied, and does not execute a copying process.

(S31) The table information updating means 22h updates the information of each of the tables.

Figure 11:
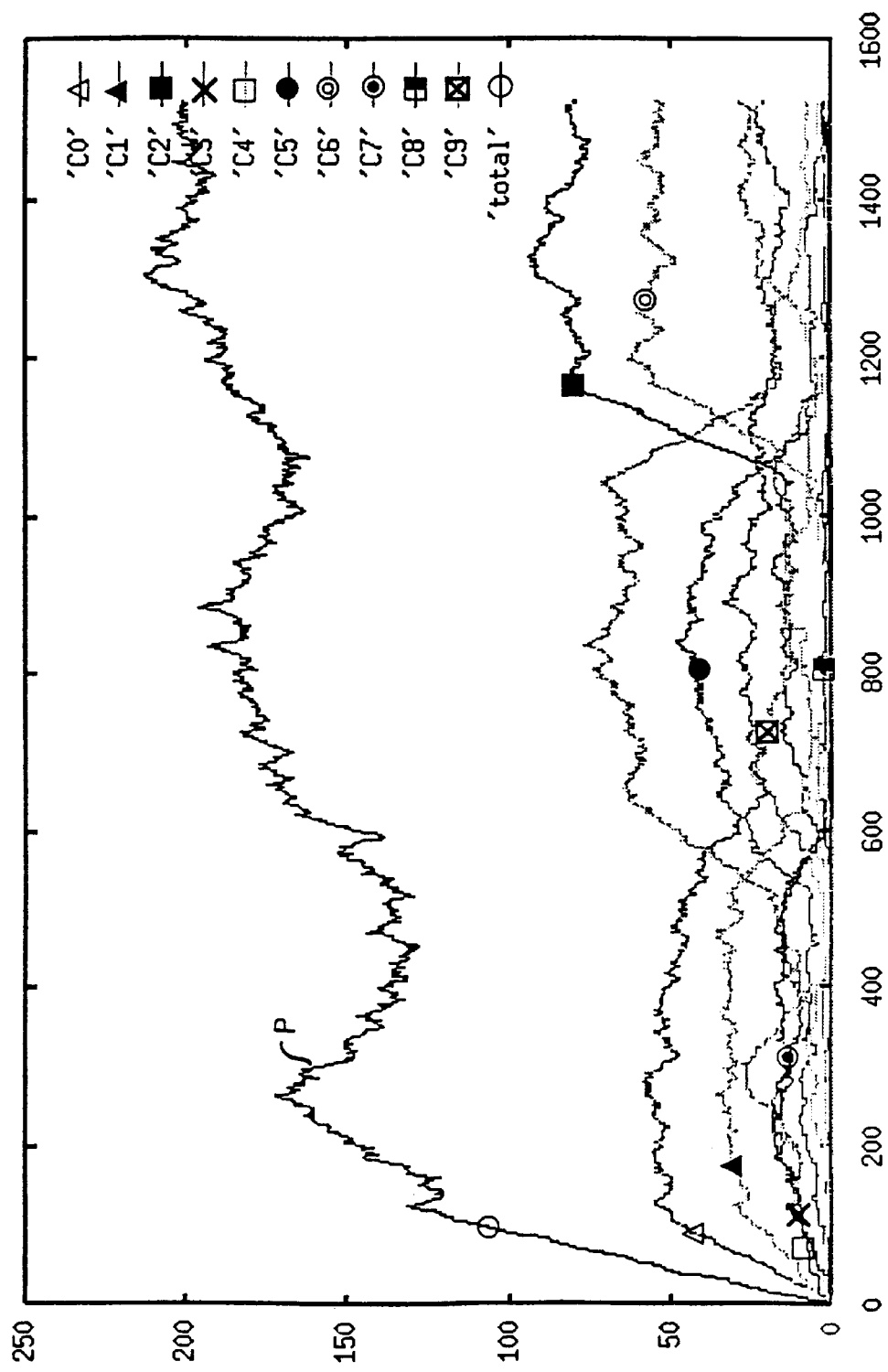
FIG. 11 is a diagram showing simulated distributions of the numbers of times that contents are simultaneously accessed in one day.

Results of a simulation that was conducted on the video server system 1 according to the present invention will be described below. FIG. 11 is a diagram which shows simulated distributions of the numbers of times that contents are simultaneously accessed in one day. The diagram shown in FIG. 11 has a vertical axis representing the number of times that a content is simultaneously accessed and a horizontal axis representing time (minutes). FIG. 11 illustrates the simulated distributions of the maximum numbers P0~P9 of times that respective contents C0~C9 are simultaneously accessed and the maximum number P of times that all the contents C0~C9 are simultaneously accessed.

In the simulation, the number of contents that can be stored in the tertiary memory 23 was 1000, the number of contents that can be stored in each of the video servers was 50, and the maximum number Nstrm of streams that can be delivered from each of the video servers was 20. The maximum numbers P0~P9 were predicted such that P0=70, P1=40, P2=100, P3=80, P4=10, P5=60, P6=60, P7=20, P8=0, and P9=30.

The percentage of call losses in the total number of content delivery requests (call loss percentage) is expressed by (the number of call losses/the number of accesses generated in one day (the number of calls))×100.

When the estimated number Nvsa of video servers according to the equation (1) was 24 and contents were statistically allocated to the video servers, the call loss percentage was 0% (=(0/2102)×100).

When the number Nvs of video servers according to the equation (2) was 11 (P=220) and the algorithm of dynamically allocating contents according to the present invention was applied while the maximum number Pi with respect to each content was obtained as a function approximately analogous to one of the simulated distributions, the call loss percentage was 1.380% (=(29/2102)×100). When the number Nvs increased to 18, the call loss percentage was 0.808% (=(17/2102)×100).

The call loss percentage of 0% achieved when contents were statistically allocated to the video servers determined according to the equation (1) was based on the assumption that the predicted numbers were valid.

Actually, more video servers would need to be installed, requiring large investments to be made in the facility of the video server system. The operator would suffer an increased burden because the contents would need to be statistically allocated.

The processes of dynamically allocating contents according to the present invention with the number Nvs of video servers being determined by the equation (2) resulted in a small call loss percentage. However, such a small call loss percentage can be made up for by improved services offered by community antenna television systems or providers which deliver the contents. For example, another program may be delivered to a client until a program requested by the client can be delivered.

According to the present invention, therefore, while a small call loss percentage may occur, since the number of video servers can be reduced, investments to be made in the facility of the video server system can be reduced, and also because contents are dynamically allocated while the video server system is in service, the burden imposed on the operator can be reduced. Consequently, the video server system according to the present invention offers much greater advantages than the conventional video server system.

As described above, the video server system 1 according to the present invention controls the storage of contents between the video servers 10a~10n based on the stream supply information for thereby dynamically allocating the contents.

Inasmuch as the number of video servers can be reduced, investments to be made in the facility of the video server system can be reduced. Since contents are dynamically allocated while the video server system is in service, the burden imposed on the operator can be reduced, allowing the video server system to provide efficient services.

Figure 12:
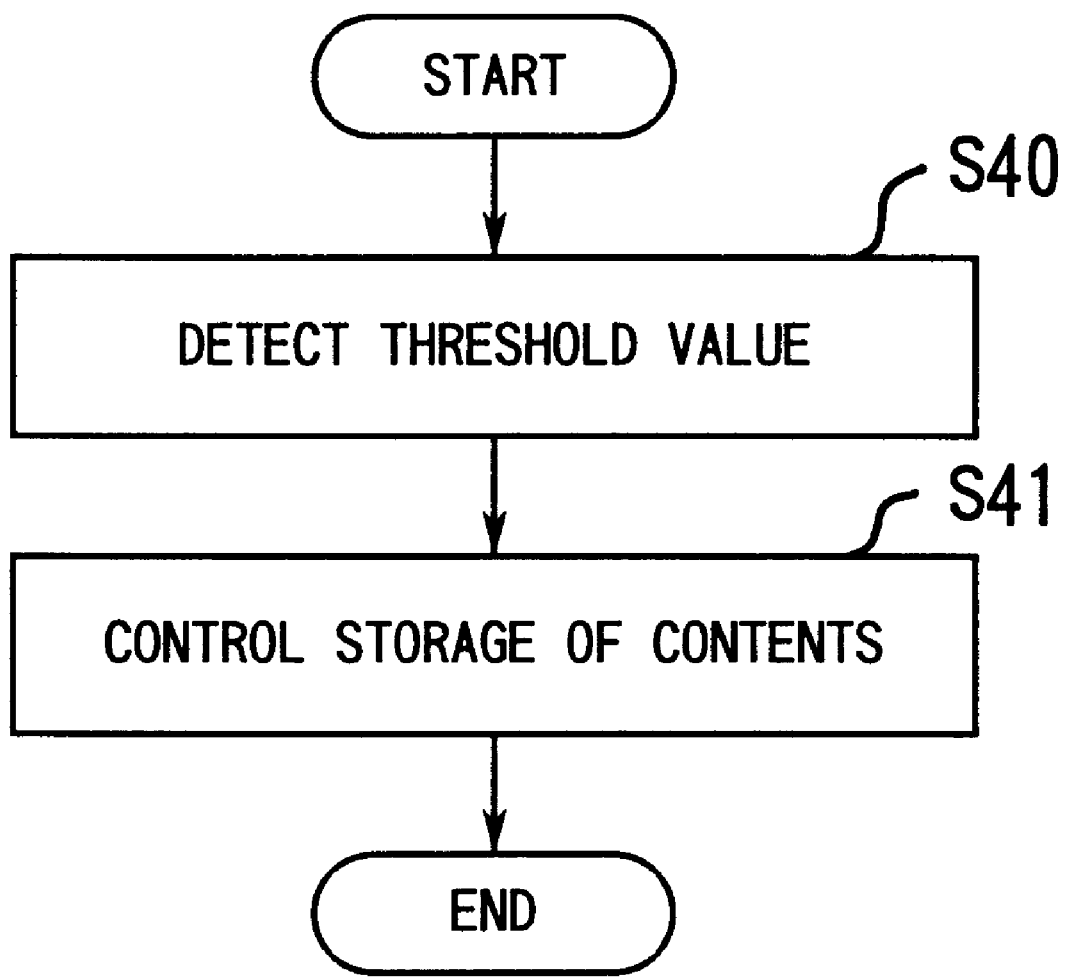
FIG. 12 is a flowchart of a processing sequence of a method of dynamically allocating contents according to the present invention.

A method of dynamically allocating contents according to the present invention will be described below. FIG. 12 shows a processing sequence of the method of dynamically allocating contents according to the present invention, with successive steps being represented by numerals prefixed by "S".

(S40) It is detected whether at least the number of streams of a content stored in a video server or the predictable number of accesses exceeds a corresponding threshold value or not.

(S41) If the number exceeds the threshold value, the storage of the content between the video server or another video server is controlled, i.e., the content is either copied, moved, or deleted.

For example, while the content C0 is being delivered from a video server, if the number of streams of the content C0 exceeds the threshold value, then the content C0 is copied to another video server, and the content C0 is delivered from the other video server. In order to maintain a quantity of streams of the content from the other video server, the content C1 which is stored in the other video server and whose number of delivered streams is small is deleted or moved.

If the predictable number of accesses to the content C0 in the video server exceeds the threshold value, then the content C0 is copied to another video server, and the content C0 is delivered from the other video server. In order to maintain a quantity of streams of the content from the other video server, the content C1 which is stored in the other video server and whose number of delivered streams is small is deleted or moved.

In the method of dynamically allocating contents according to the present invention, as described above, if the number of streams of a content stored in a video server or the predictable number of accesses exceeds a corresponding threshold value, then the storage of the content between the video server or another video server is controlled to dynamically allocate the contents.

Inasmuch as the number of video servers can be reduced, investments to be made in the facility of the video server system can be reduced. Since contents are dynamically allocated while the video server system is in service, the burden imposed on the operator can be reduced, allowing the video server system to provide efficient services.

Figure 13:
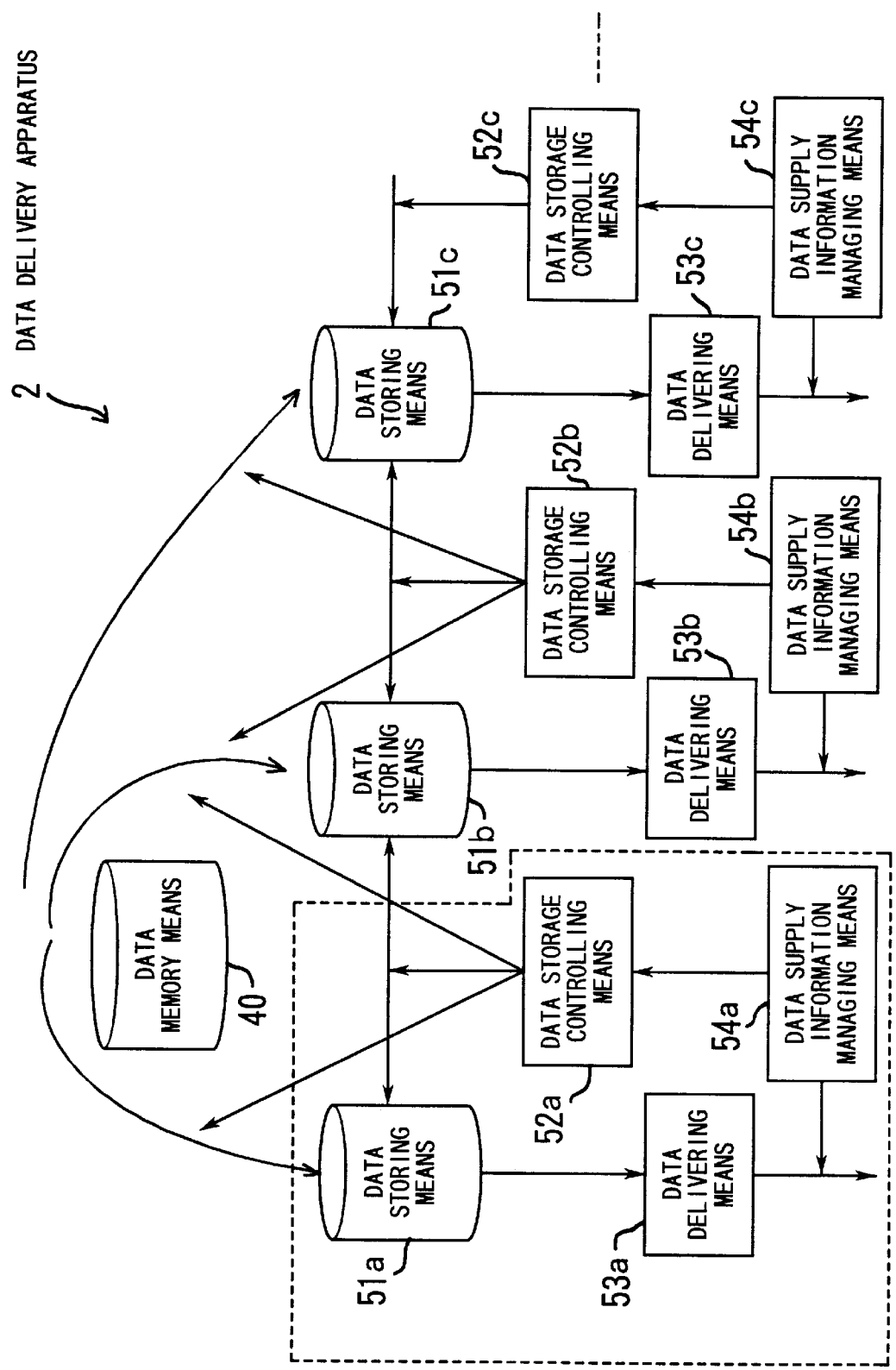
FIG. 13 is a block diagram of a data delivery apparatus for delivering data according to the present invention.
Figure 14:
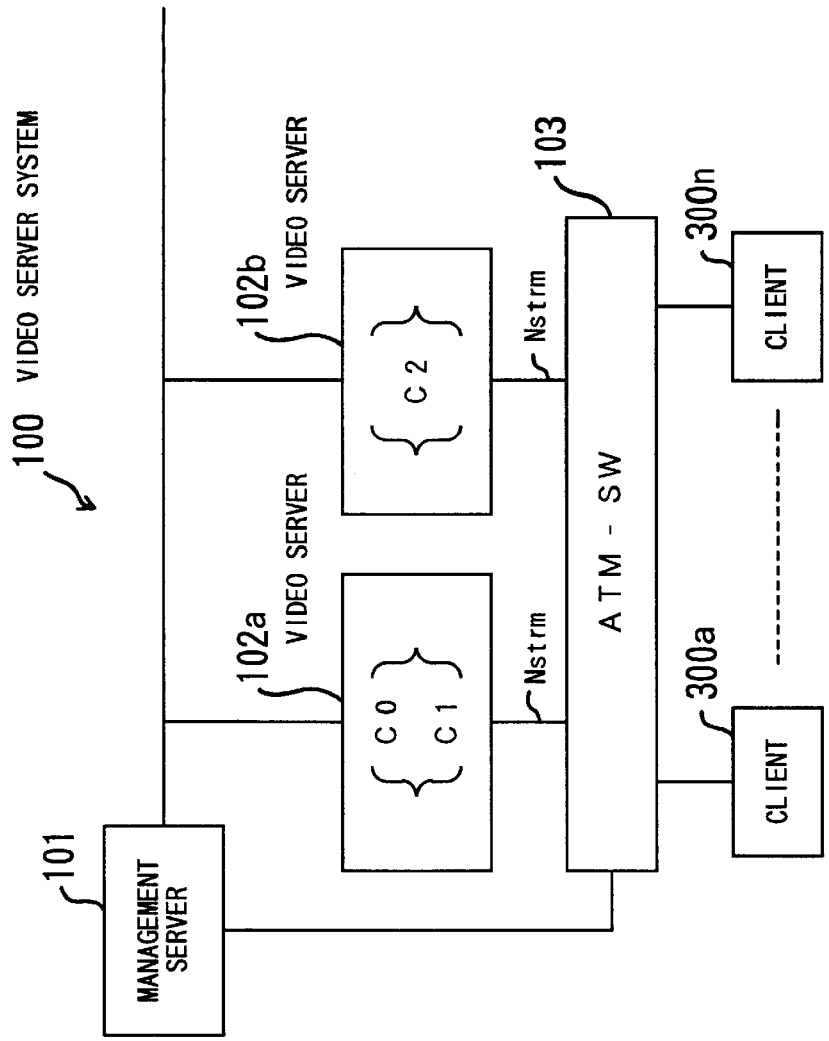
FIG. 14 is a block diagram of a prior art video server system.
Figure 15:
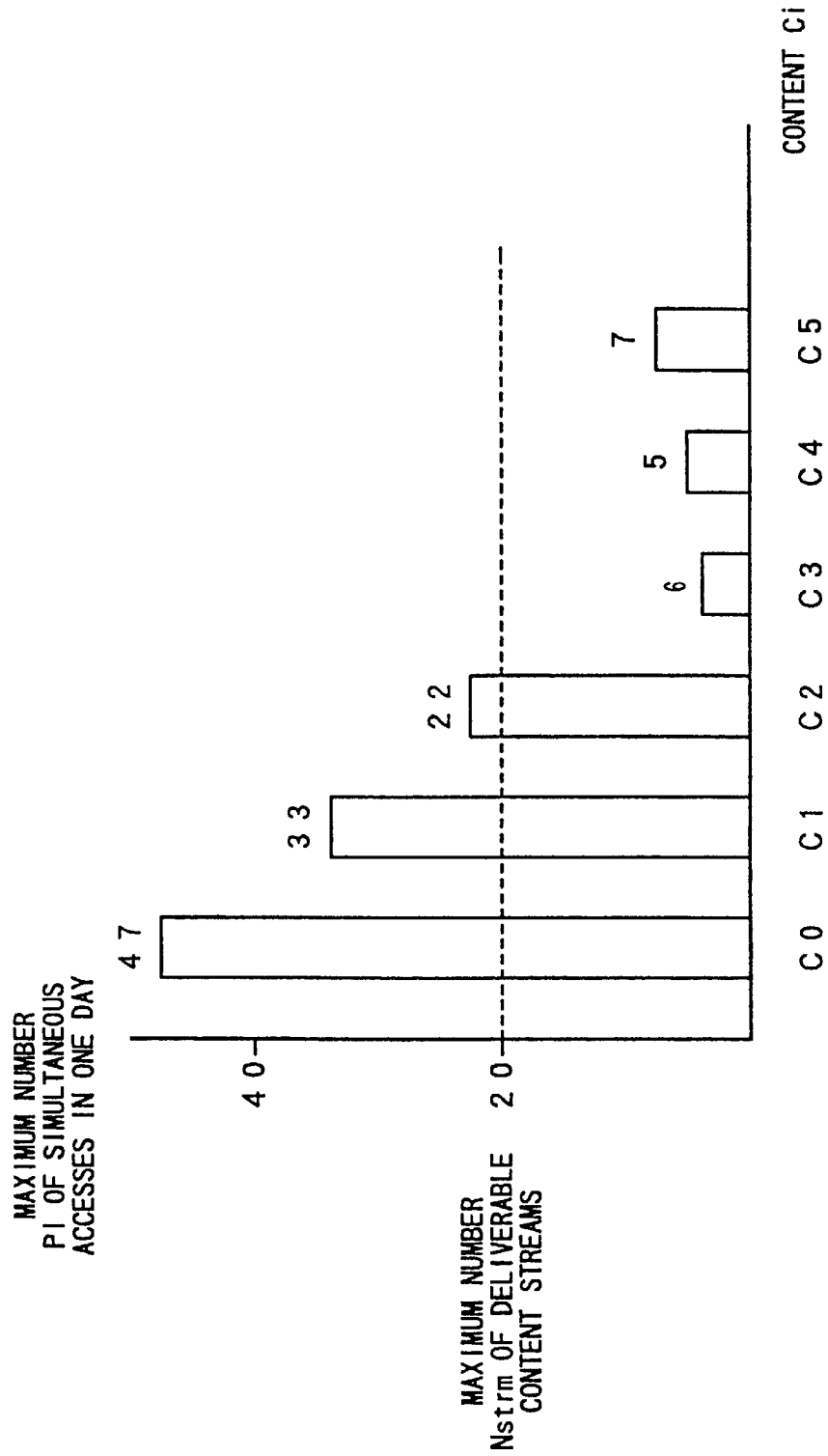
FIG. 15 is a diagram showing the maximum numbers of times that respective contents are simultaneously accessed in one day for the prior art video server.
Figure 16:
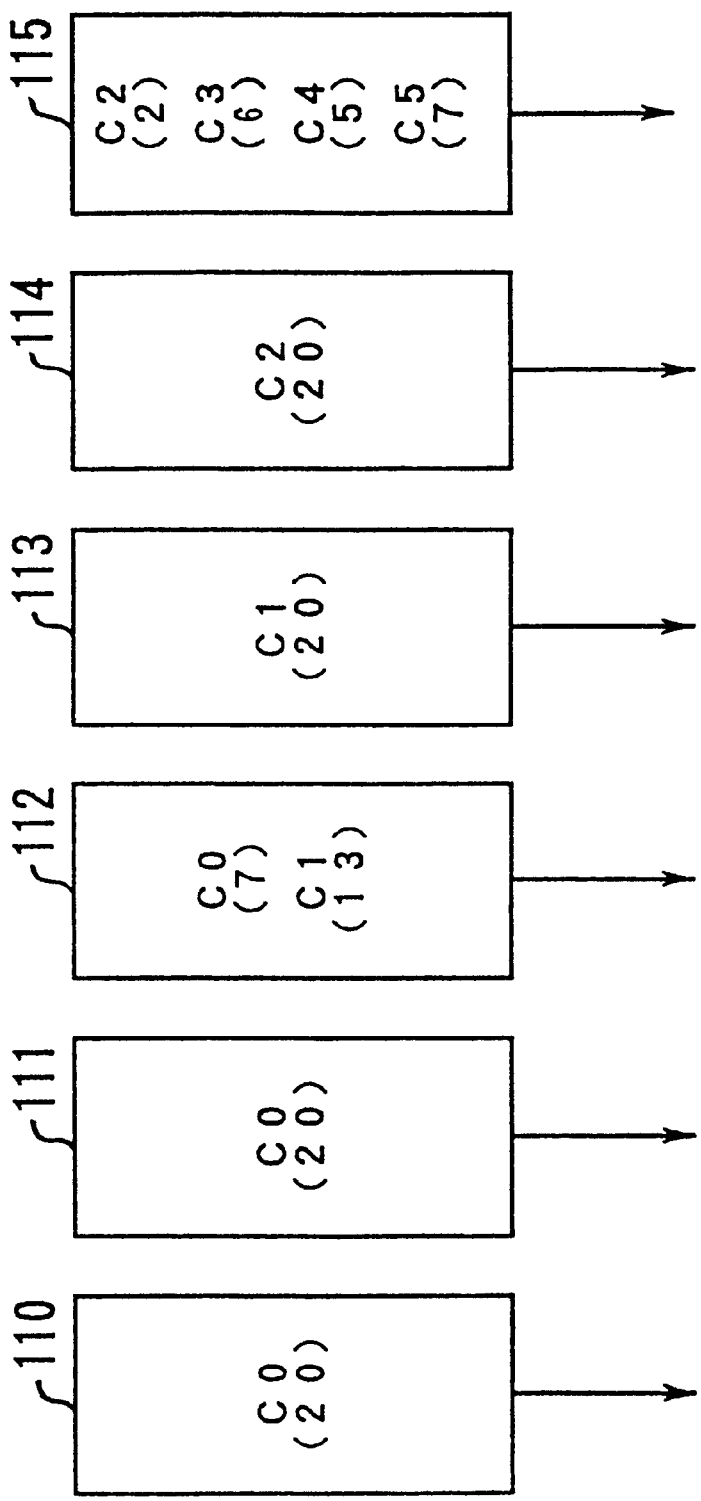
FIG. 16 is a block diagram of prior art video servers to which contents are allocated.
Figure 17:
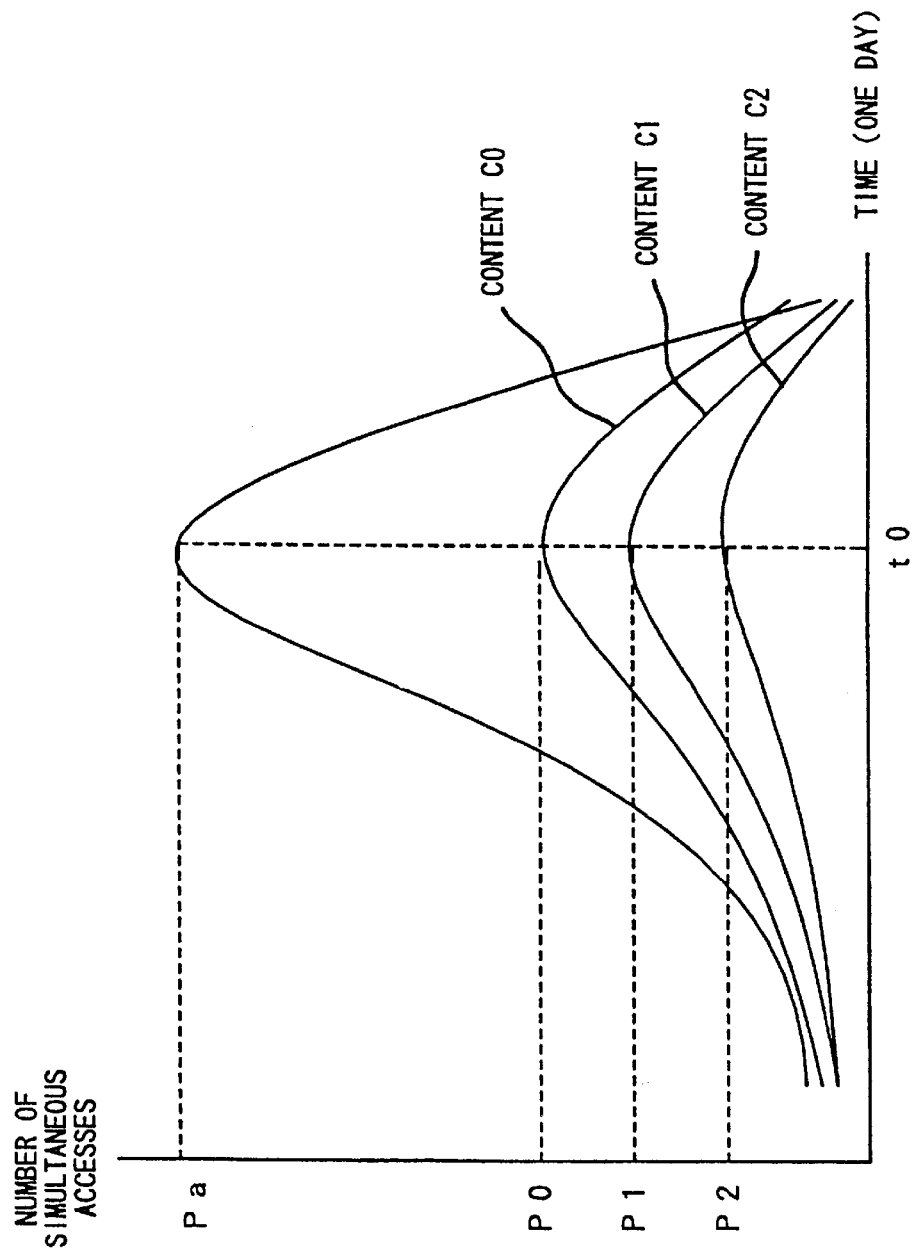
FIG. 17 is a diagram showing distributions of the numbers of times that the contents are accessed.

FIG. 13 shows a data delivery apparatus 2 for delivering data according to the present invention.

As shown in FIG. 13, the data delivery apparatus 2 has a data memory means 40 which comprises a mass-storage memory for storing a data file of data to be delivered to clients.

The data delivery apparatus 2 also has a plurality of data storing means 51a~51c for storing data to be requested by clients. Specifically, the data storing means 51a~51c store data fetched from the data memory means 40 or data copied, moved, or otherwise transferred between the data storing means 51a~51c.

The data delivery apparatus 2 further includes a plurality of data delivering means 53a~53c for delivering data stored in the data storing means 51a~51c, and a plurality of data supply information managing means 54a~54c for managing data supply information relative to the delivery of data. The data supply information represents the amounts of data delivered from the data delivering means 53a~53c, the amounts of data stored in the data storing means 51a~51c, etc.

The data delivery apparatus 2 also has a plurality of data storage controlling means 52a 52c for controlling the storage of data between the data memory means 40 and the data storing means 51a~51c or between the data storing means 51a~51c based on the data supply information.

If the above various means of the data delivery apparatus 2 are applied to the video servers of a video server system, then it is possible to dynamically allocate data (contents)

between the video servers. For example, the means contained within a block indicated by the dotted lines in FIG. 13 may be installed in a single video server. The data memory means 40 may be installed as a global memory in the video server system.

Since the installation of the means in the video servers allows them to be controlled in a distributed fashion, the burden imposed on the overall video server system may be lessened.

In the data delivery apparatus 2 for delivering data according to the present invention, as described above, the storage of data is controlled between the data memory means 40 and the data storing means 51a~51c or between the data storing means 51a~51c based on the data supply information. Because the data can dynamically allocated to the data storing means 51a~51c, the data delivery apparatus 2 can provide efficient services.

As described above, the video server system according to the present invention controls the storage of contents between the video servers based on the stream supply information for thereby dynamically allocating the contents. Inasmuch as the number of video servers can be reduced, investments to be made in the facility of the video server system can be reduced. Since contents are dynamically allocated while the video server system is in service, the burden imposed on the operator can be reduced, allowing the video server system to provide efficient services.

In the method of dynamically allocating contents according to the present invention, as described above, if the number of streams of a content stored in a video server or the predictable number of accesses exceeds a corresponding threshold value, then the storage of the content between the video server or another video server is controlled to dynamically allocate the contents. Inasmuch as the number of video servers can be reduced, investments to be made in the facility of the video server system can be reduced. Since contents are dynamically allocated while the video server system is in service, the burden imposed on the operator can be reduced, allowing the video server system to provide efficient services.

In the apparatus for delivering data according to the present invention, as described above, the storage of data is controlled between the data memory means and the data storing means or between the data storing means based on the data supply information. Because the data can dynamically allocated to the data storing means, the apparatus can provide efficient services.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A video server system for controlling the delivery of contents requested by clients, comprising:

a plurality of video servers having respective contents storing means for storing contents and respective contents delivering means for delivering contents; and a management server having stream supply information managing means for managing stream supply information relative to the delivery of said contents and contents dynamic allocating means for controlling the storage of said contents between said video servers to dynamically allocate contents based on a predicted maximum number of times that respective video servers are simultaneously accessed at a given time, and allocating contents according to a video server having a smallest predicted maximum number of simultaneous accesses at the given time.

2. A video server system according to claim 1, wherein a number of said video servers in said video server system is determined based on the maximum number of times that all said contents are simultaneously accessed.

3. A video server system according to claim 1, wherein said stream supply information managed by said stream supply information managing means comprises video server operating status information, contents allocation managing information, and tertiary memory operating status information.

4. A video server system according to claim 1, wherein said contents dynamic allocating means comprises means for dynamically allocating contents only when there is a request from at least one of the clients.

5. A video server system according to claim 1, wherein said contents dynamic allocating means comprises means for copying, moving, or deleting contents to control the storage of the contents.

6. A video server system according to claim 1, wherein said contents dynamic allocating means comprises means for dynamically allocating contents based on a predicted number of insufficient resources of said contents.

7. A method of dynamically allocating contents between video servers, comprising the steps of:

predicting a maximum number of times that respective video servers are simultaneously accessed at a given time; and controlling the storage of the content between the video servers to dynamically allocate the content to a video server having a smallest predicted maximum number of simultaneous accesses at the given time.

8. A method according to claim 7, wherein said step of controlling the storage of the content comprises the step of either copying, moving, or deleting the content.

* * * * *